United States Patent [19]

Meuer et al.

[11] Patent Number: 5,219,040
[45] Date of Patent: Jun. 15, 1993

[54] CENTRAL-LUBRICATION ASSEMBLY

[75] Inventors: Johannes Meuer; Dieter Todtenhaupt; Dieter Schönherr, all of Berlin, Fed. Rep. of Germany

[73] Assignee: Willy Vogel AG, Berlin, Fed. Rep. of Germany

[21] Appl. No.: 819,341

[22] Filed: Jan. 9, 1992

[30] Foreign Application Priority Data

Jan. 10, 1991 [DE] Fed. Rep. of Germany ....... 4100726

[51] Int. Cl.[5] .......................................... F16N 13/22
[52] U.S. Cl. ..................................... 184/7.4; 184/6.28; 184/7.2; 222/325
[58] Field of Search ................ 222/325, 333, 256, 372; 184/7.4, 7.3, 7.2, 6.28; 417/310

[56] References Cited

U.S. PATENT DOCUMENTS

| | | | |
|---|---|---|---|
| 2,353,734 | 7/1944 | Kocher | 184/7.3 |
| 2,566,702 | 9/1951 | Harrigan | 222/325 |
| 2,777,610 | 1/1957 | Fox et al. | 222/325 |
| 2,928,243 | 3/1960 | Albright | 417/310 |
| 2,928,574 | 3/1960 | Wagner | 222/333 |
| 3,139,221 | 6/1964 | Swanson | 222/333 |
| 4,219,131 | 8/1980 | Funderburgh | 222/256 |
| 4,347,048 | 8/1982 | Kawabata et al. | 417/310 |
| 4,651,903 | 3/1987 | Pagliai | 222/333 |
| 4,971,527 | 11/1990 | Dick | 417/310 |

Primary Examiner—Ira S. Lazarus
Assistant Examiner—Alan B. Cariaso
Attorney, Agent, or Firm—Mark P. Stone

[57] ABSTRACT

In a central-lubrication assembly, a lubricant pump (3), a valve block (4), a drive motor (5) and a group of lubricant distributors (9) are fastened to the cover (2) of a housing (1) in the manner of a mounting unit. Above the housing (1) are arranged two lubricant cartridges (17, 18), one (18) of which forms a reserve cartridge, whilst the other is connected to the valve block (4) via a passage (14).

14 Claims, 1 Drawing Sheet

CENTRAL-LUBRICATION ASSEMBLY

BACKGROUND OF THE INVENTION

The invention relates to a central-lubrication assembly for vehicles, with a lubricant reservoir, with a lubricant pump, with a drive motor for the lubricant pump and with a pressure-relief valve for lubricant distributors to be connected and designed as post-lubricating distributors, the lubricant pump, its drive motor and a valve block receiving the pressure-relief valve being accommodated in a closed housing.

German Auslegeschrift 1,184,659 makes known a central-lubrication assembly of the foregoing type, in which the lubricant pump is designed as a submerged pump and is arranged, together with the pressure-relief valve and a pressure-limiting valve, in the lubricant reservoir which therefore here forms part of the housing. Above the lubricant reservoir, the drive motor connected to a control unit and intended for the lubricant pump is arranged, protected by a cowl, in a housing part shut off from the lubricant reservoir. Pipelines lead from the lubricant pump to lubricant distributors located at various points of the vehicle. The known assembly works satisfactorily and, because of its large-volume lubricant reservoir, is unrestrictedly suitable for installation in vehicles in which a large number of lubricating points are to be supplied with fluid grease. In smaller vehicles not normally used by professional drivers, however, the handling and maintenance leave much to be desired, insofar as the refilling of the lubricant reservoir makes it necessary to separate it from the lubrication assembly, this not only being complicated, but also entailing the risk of soiling.

SUMMARY OF THE INVENTION

The invention pursues the aim of providing a central-lubrication assembly which is especially suitable for light trucks and which, whilst having a compact design, is easy to handle and to maintain. In a central-lubrication assembly of the type under consideration, this object is achieved in that on the top side of the housing is arranged a recess which serves for holding the mouthpiece of a lubricant cartridge and which is connected via a passage to the valve block and via the latter to the inlet of the lubricant pump, the outlet of which is connected to a group of at least four lubricant distributors fastened to the outside of a cover of the housing which on its inside carries the valve block, lubricant pump and drive motor.

The central-lubrication assembly according to the invention affords, in addition to the advantage of its compactness, the advantage of a construction which is easy to mount and dismount, that is to say is cost-effective. All the important parts are arranged on the housing cover forming a mounting plate. For maintenance purposes, therefore, it is merely necessary to unscrew the housing cover and all the components are easily accessible. The use of lubricant cartridges filled with fluid grease instead of a particular lubricant reservoir to be refilled makes handling easier and, furthermore, avoids the need for work to clean the lubricant reservoir.

BRIEF DESCRIPTION OF THE DRAWINGS

Further details and features of the invention emerge from the subclaims and from the following description of a preferred exemplary embodiment illustrated in the accompanying drawing. In this:

DESCRIPTION OF THE BEST MODE FOR CARRYING OUT THE INVENTION

Figure 1:
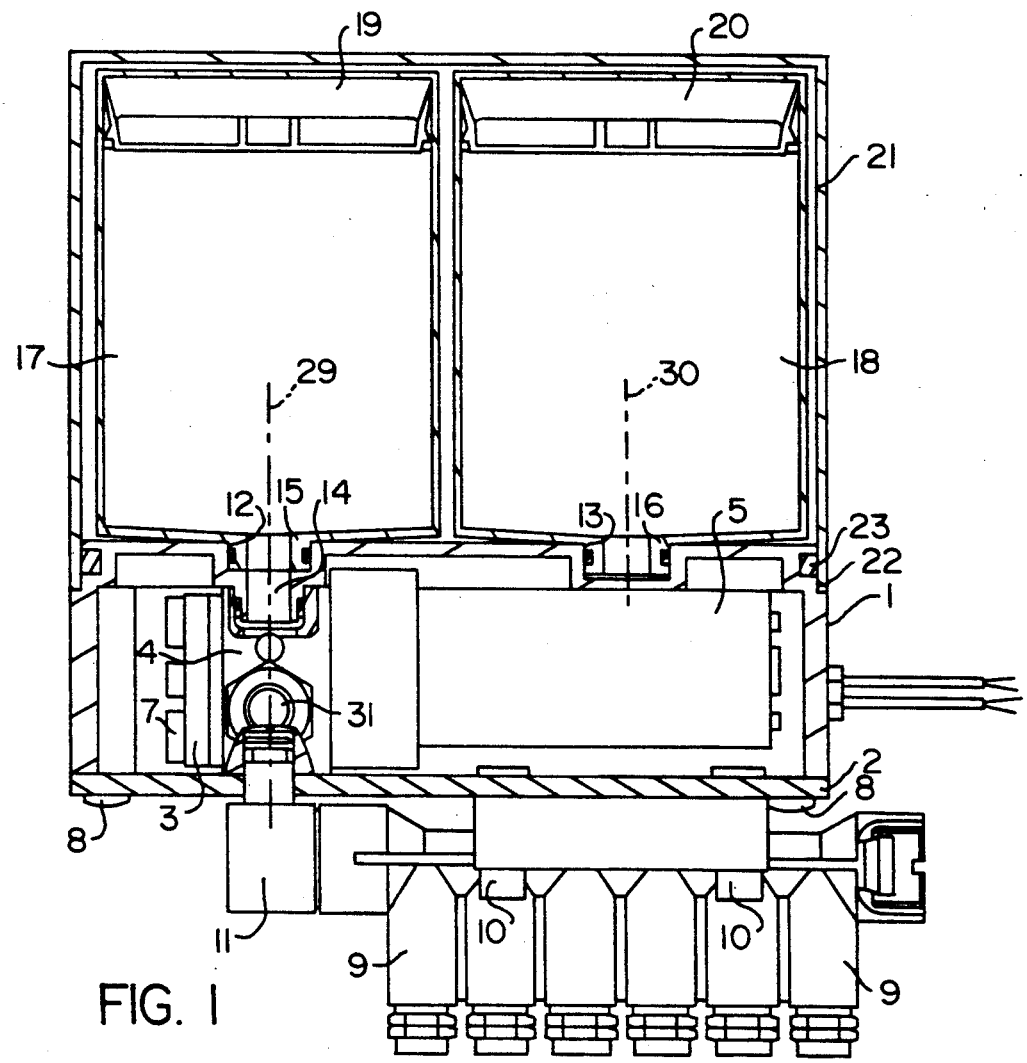
FIG. 1 shows, partially in section, a side view of a central-lubrication assembly.
Figure 2:
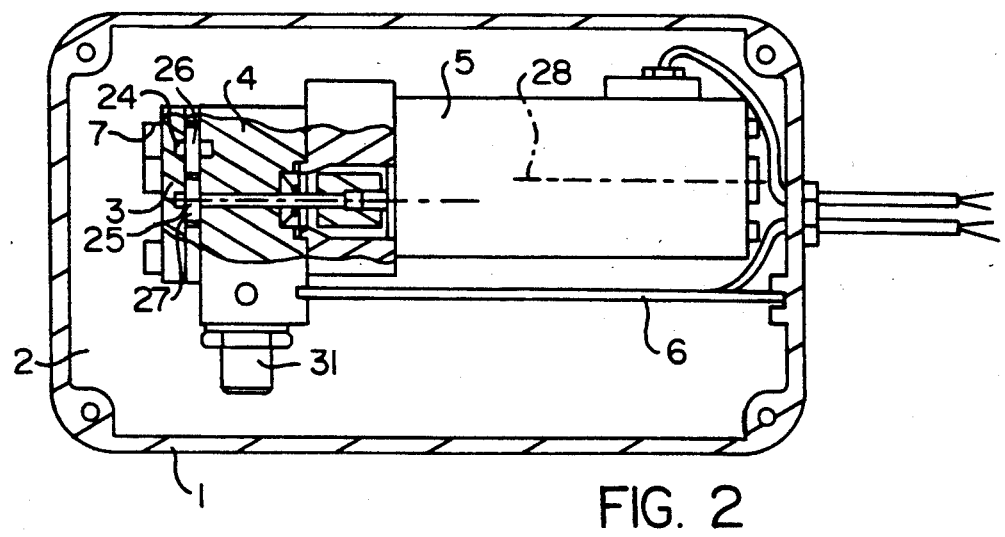
FIG. 2 shows, likewise partially in section, a top view of the lubricant pump and the parts of the central-lubrication assembly according to FIG. 1 which connect it to its drive motor.

In FIG. 1, 1 is a housing which can be closed by means of a cover 2 and in which are accommodated in a protected manner a lubricant pump 3 designed as a gear pump, a valve block 4, a drive motor 5 for the lubricant pump 3 and a control board 6. The lubricant pump 3 and the drive motor 5 are connected by means of screws 7 to the valve block 4 which is itself screwed to the inside of the cover. Screws 8 serve for connecting the cover 2 to the housing 1. Arranged on the outside of the cover 2 are six lubricant distributors 9 which are combined to form a subassembly and are designed as post-lubricating distributors and which are in turn held by means of screws 10. The lubricant distributors 9 are connected to the valve block 4 via an intermediate piece 11. The cover 2 thus forms a mounting plate, easily separable from the housing 1, for the functionally important parts of the assembly. A pressure-relief valve 31 is received within the valve block 4 for connecting the lubricant distributors to the pressure-relief valve received within the valve block.

On the top side of the housing 1, the latter has two recesses 12 and 13, one of which is connected to the valve block 4 via a passage 14 forming an adjusting connection. Into the recesses 12 and 13 project the mouthpieces 15, 16 of two lubricant cartridges 17, 18 which are filled with fluid grease and which are both each equipped with a follower piston 19 and 20. Whereas the mouthpiece 15 of the lubricant cartridge 17 is open, the mouthpiece 16 of the lubricant cartridge 18 is sealed by means of a pull-off foil. The two cartridges 17, 18 are protected against soiling by a cowl 21, a continuous collar 22 on the housing 1 and a resilient sealing ring 23 serving for mounting the cowl 21.

Because the axes 24, 25 of the gearwheels 26, 27 of the lubricant pump and the axis 28 of the drive motor 5 extend perpendicularly to the axes 29, 30 of the lubricant cartridges 17, 18, that is to say are arranged horizontally, the housing 1 and cowl 21 take up little space, so that accommodating the entire assembly on a vehicle presents no problems.

We claim:

1. A central-lubrication assembly for vehicles, with a lubricant reservoir, with a lubricant pump, with a drive motor for the lubricant pump and with a pressure relief valve for lubricant distributors to be connected to said pressure-relief valve; the lubricant pump (3), its drive motor (5) and a valve block (4) receiving the pressure-relief valve being accommodated in a closed housing (1) having a top side and at least one side wall extending downwardly therefrom, wherein arranged on the top side of the housing (1) is a recess (12) which serves for mounting a mouthpiece (15) of a lubricant cartridge (17) and which is connected via a passage (14) to the valve block (4) and via the valve block (4) to an inlet of the lubricant pump (3), an outlet of said lubricant pump (3) is connected to a group of at least four lubricant distributors (9) fastened to the outside of a cover (2) forming a bottom side of the housing (1), the inside of said cover (2) carrying the valve block (4), the lubricant pump (3) and the drive motor (5).

2. The central-lubrication assembly as claimed in claim 1, wherein the passage (14) connecting the recess (12) to the valve block (4) forms an adjusting connection for the parts fastened to the cover (2), said passage (14) and said cover (2) forming a mounting unit.

3. The central-lubrication assembly as claimed in claim 1, wherein a control board (6) is arranged in the housing (1).

4. The central-lubrication assembly as claimed in claim 2, wherein the control board (6) forms an integral part of the mounting unit.

5. The central-lubrication assembly as claimed in claim 1, wherein the lubricant pump (3) and its drive motor (5) are fastened to the valve block (4) and only the latter is screwed to the cover (2).

6. The central-lubrication assembly as claimed in claim 5, wherein the valve block (4) is connected to the lubricant distributors (9) via an intermediate piece (11).

7. The central-lubrication assembly as claimed in claim 1, wherein the lubricant pump (3) is designed as a gear pump.

8. The central-lubrication, assembly as claimed in claim 7, wherein the axes (24, 25) of a pair of gear wheels (26, 27) of the lubricant pump (3) and the axis (28) of the drive motor (5) extend perpendicularly to the longitudinal axis (29) of the lubricant cartridge (17).

9. The central-lubrication assembly as claimed in claim 1, wherein the lubricant cartridge (17) arranged above the housing (1) has a follower piston (19).

10. The central-lubrication assembly as claimed in claim 1, wherein arranged on the top side of the housing (1) is an additional recess (13) for receiving the mouthpiece (16) of a reserve lubricant cartridge (18).

11. The central-lubrication assembly as claimed in claim 1, wherein the housing (1) is equipped with a collar (22) for a cowl (21) covering the lubricant cartridge or lubricant cartridges (17, 18).

12. The central-lubrication assembly as claimed in claim 2, wherein a control board (6) is arranged in the housing (1).

13. The central-lubrication assembly as claimed in claim 3, wherein the control board (6) forms an integral part of the mounting unit.

14. The central-lubrication assembly as claimed in claim 1 wherein said lubricant distributors are designed as post-lubricating distributors.

* * * * *